United States Patent [19]

Meriwether

[11] Patent Number: 4,974,538
[45] Date of Patent: Dec. 4, 1990

[54] FILLED FLOAT DRUM

[75] Inventor: Jon D. Meriwether, Follansbee, W. Va.

[73] Assignee: The Louis Berkman Company, Follansbee, W. Va.

[21] Appl. No.: 401,828

[22] Filed: Sep. 1, 1989

[51] Int. Cl.⁵ .................................... B63B 35/34
[52] U.S. Cl. .................................... 114/267; 114/357; 405/219
[58] Field of Search .............. 114/263, 264, 265, 266, 114/267, 357; 405/218, 219

[56] References Cited

U.S. PATENT DOCUMENTS

| | | | |
|---|---|---|---|
| 2,866,985 | 1/1959 | Blackmore | 114/357 |
| 3,242,245 | 3/1966 | Greig et al. | 264/89 |
| 3,250,660 | 5/1966 | Greig et al. | 156/581 |
| 3,412,183 | 11/1968 | Anderson et al. | 264/40 |
| 3,446,172 | 5/1969 | Morton et al. | 114/267 |
| 3,599,257 | 8/1971 | Erickson | 114/357 |
| 3,752,102 | 8/1973 | Shuman | 114/0.5 R |
| 4,161,796 | 7/1979 | Kostanecki | 114/357 |
| 4,365,577 | 12/1982 | Heinrich | 114/267 |
| 4,799,445 | 1/1989 | Meriwether | 114/267 |

Primary Examiner—Sherman Basinger
Assistant Examiner—Stephen P. Avila
Attorney, Agent, or Firm—Body, Vickers & Daniels

[57] ABSTRACT

An improved polyethylene float drum for marine structures has a preformed polystyrene core which is configured to dimensionally conform to the interior surfaces of the polyethylene walls of the drum. Because the preformed core fills the entire enclosure of the float drum, a dimensionally controlled float drum is provided with superior strength characteristics.

3 Claims, 5 Drawing Sheets

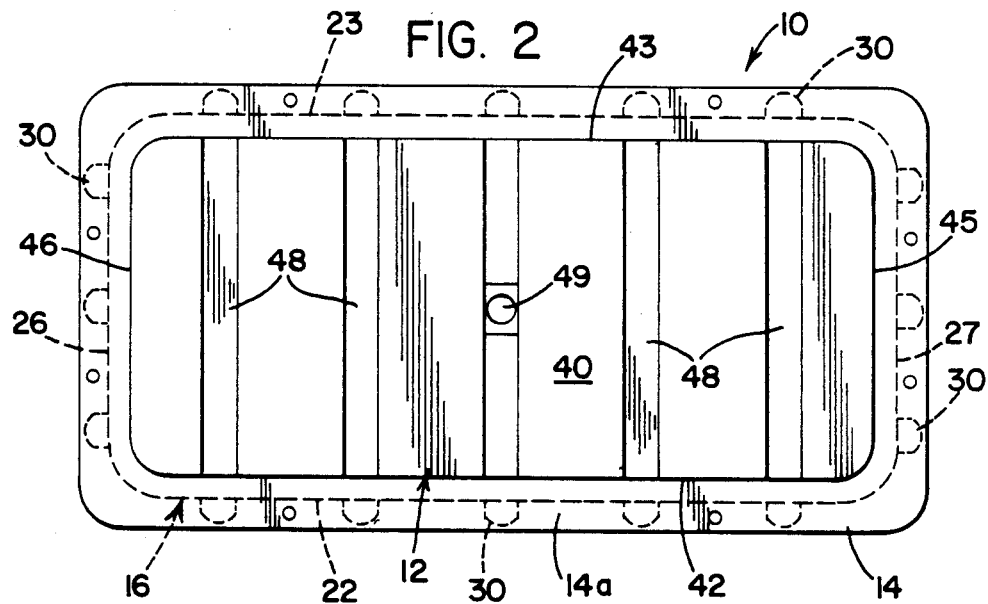
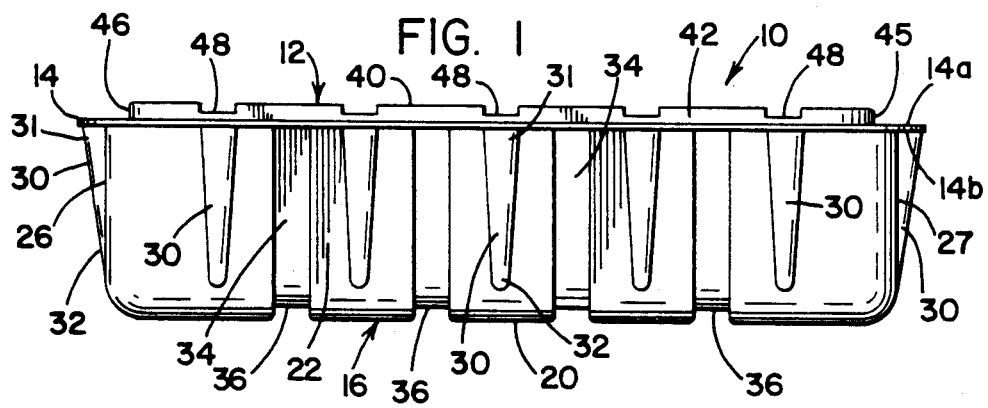
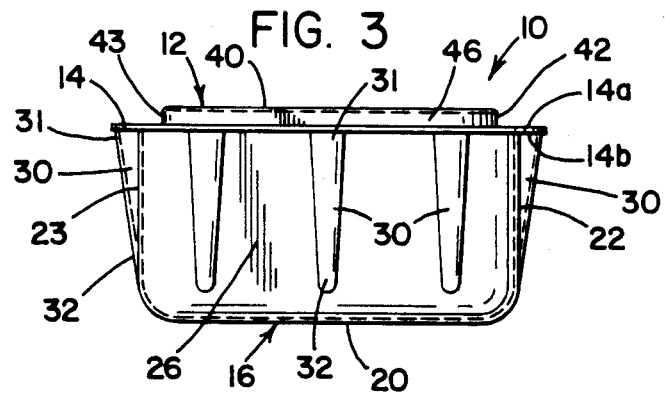

TWIN SHEET PROCESS

FILLED FLOAT DRUM

This invention relates generally to plastic, float drums and more particularly to float drums which are filled with a flotation material.

The invention is particularly applicable to float drums for use with floating docks, floating pipe lines, swim floats and the like and will be described with particular reference thereto. However, it will be appreciated that the invention may have broader application and may be used to provide buoyancy to any structure desired to be floated in a liquid medium.

INCORPORATION BY REFERENCE

The following documents are incorporated herein by reference and are to be considered as forming part and parcel hereof:

(a) My prior U.S. Pat. No. 4,799,445 which issued Jan. 24, 1989.

(b) Heinrich U.S. Pat. No. 4,365,577 (Dec. 28, 1982).

(c) Shuman U.S. Pat. No. 3,752,102 (Aug. 14, 1973).

(d) Process U.S. Pat. Nos. 3,242,245 to Greig (Mar. 22, 1966); 3,250,660 to Greig (May 10, 1966); and 3,412,183 to Anderson (Nov. 19, 1968).

BACKGROUND

Float drums have evolved from crude sealed metal drum and blocks of styrofoam into hollow polyethylene shells which are precisely configured and designed to fit especially within intricate dock structures typically sold in kit form. An example of an early design of a hollow polyethylene float is disclosed in the Shuman patent noted above and marketed today by the assignee of the present invention under the "Dayton" brand name. My prior patent (U.S. Pat. No. 4,799,445) describes a current, state of the art polyethylene float and the integration of the float within sophisticated floating marine structures. Specifically, today's floats are constructed with rigidized circumscribing flanges for secure mounting to the dock structure; ribs secured to the underside of the flange for strengthening the side walls and the flange and spaced indentations which also strengthen the float walls while providing indentations for receiving dock structure members or, alternatively, for interlocking the float drums one on top of the other or side-by-side.

Polyethylene float drums are typically formed as hollow shells in a process generally described in the trade as "twin sheet forming". The process is generally described in the process patents noted above in subparagraph (d) and incorporated by reference herein. The floats are then marketed either as hollow, air filled floats or the floats are filled with a flotation material. In the latter instance, a hole is provided in the drum and a urethane foam is injected into the float, expanded and cured. As noted in the Heinrich patent, the urethane is usually introduced into the float while the float is still confined to prevent bulging. When the urethane is cured, the filled float provides a somewhat rigid foam reinforcement for polyethylene walls thus adding strength to the float while also preventing leakage of water into the float if the polyethylene walls are accidentally or maliciously punctured.

While the foam filled polyethylene floats have inherent advantages over hollow or air filled floats, in practice problems have been encountered. First, whether or not the polyethylene float is retained in the forming die or in some other fixture while the urethane foam is injected, the configuration of present day float drums is such that the foam, when cured, does not expand against all the walls of the float. Spaces between the foam and the polyethylene walls inevitably occur with the result that the wall can flex until encountering the cured foam. While the float would not sink even if the walls could flex to the point of rupture, the strength or rigidity of the float is obviously less than what is otherwise possible. Another problem which has been encountered is that, inherent in the twin sheet forming process, shrinkage does occur when the polyester dries. Because of the especially configured shape of the drum which prevents the form from uniformly contorting the entire wall surface, the walls can become bowed and sometimes significantly so. The bowed or distorted walls which are not corrected by the foam fill make the float aesthetically unattractive and could interfere somewhat with the usefulness of the indentation features, etc.

SUMMARY OF THE INVENTION

Accordingly, it is a principle object of the present invention to provide a filled polyethylene float drum which is an improvement over the foam filled prior art float drums discussed above.

This object along with other features of the invention is achieved in the polyethylene float drum for supporting marine structures which includes a configured hollow top wall portion terminating in a circumscribing top flange and a configured hollow bottom wall portion terminating in a circumscribing bottom flange. The top and bottom flanges are integrally sealed together so that the top and bottom portions define an enclosure having a predetermined configuration in turn defined by the interior surfaces of the top and bottom float portions. A solid, core of preformed flotation material substantially fills the entire volume of the configured enclosure so that the polyethylene float is positively assured of having rigidized wall surfaces. The preformed material is preferably polystyrene.

Specifically, the external dimensions of the core conform exactly to the internal dimensions of the top and bottom polyethylene portions so that the float has closely controlled dimensional tolerances without the presence of buckled or wavy walls and the like.

In accordance with another feature of the invention, the bottom wall portion of the float has a bottom wall, a pair of contiguous side walls extending from the sides of the bottom wall and a pair of contiguous end walls extending from the ends of the bottom wall. Each end wall is contiguous with a side wall and each side and end wall terminates in the load bearing, rigidizing bottom side flange which circumscribes the bottom wall portion and extends away from the bottom wall. At least one of the side walls is relatively flat and has at least one flange supporting rib integrally formed therein and interrupting the flatness of the side wall. The rib is generally in the shape of a semi-circular truncated cone with the larger diameter portion integral with the flange and its smaller diameter portion somewhat adjacent the bottom wall. The core has a bottom wall, a pair of contiguous end walls extending from the ends of the bottom wall and a pair of side walls extending from the sides of the bottom wall with the side walls and the end walls terminating in a top wall. The core side and end walls extend beyond the lower portion of the polyethylene side and end walls and at least one of the core side walls has a relatively flat surface with a protrusion extending therefrom shaped as a generally truncated, semi-circular cone. Importantly, the protrusion is in full contact with the interior surface of the polyethylene rib insuring the rigidity of the polyethylene side wall. Similarly, the top wall portion of the float has a top wall, a pair of contiguous end walls extending from the ends of the top wall and a pair of contiguous side walls extending from the sides of the top wall with the end and side walls terminating in the load bearing rigidizing top side flange. The top wall of the top portion of the polyethylene float is generally flat with a series of space indentations extending side to side and partially rectangular in cross-sectional configuration. The core's top wall is generally flat with spaced indentations generally identical to that of the polyethylene indentations thus rigidizing and strengthening the polyethylene's top wall. Further, the side walls and the bottom wall of the lower portion of the polyethylene float has spaced indentations similar to those formed in the top wall and the side walls and the bottom wall of the core has generally identical indentations extending therefrom and again mating within the polyethylene float indentations to likewise strengthen and/or rigidize the side walls and bottom wall of the lower portion of the polyethylene float.

In accordance with yet another feature of the invention, the thickness of the walls of the lower portion of the polyethylene float may be reduced from that conventionally used in existing polyethylene side, end and bottom walls to effect a raw material savings and a lower cost float. In connection with this feature, it is contemplated that while any number of lightweight, buoyant plastic compositions which are capable of being molded into a preformed shape can be used as the preformed core, the polystyrene core used in the invention has a composition which produces a compressive strength at least equal to and preferably higher than that of the foam filled plastics now used in the floats.

In accordance with a more specific aspect of the invention, the thickness of the load bearing flanges on the float may be kept at present day standards while the thickness in the wall sections could be reduced.

It is thus a principal object of the present invention to provide a filled polyethylene float for marine application which is rigidized and/or strengthened when compared to conventional foam filled polyethylene float drums.

It is yet another object of the present invention to provide a filled polyethylene float drum which does not have buckled or bowed walls and/or is produced within consistent closely controlled dimensional tolerances.

It is still yet another object of the invention to provide a filled, polyethylene float drum which uses a lesser amount of polyethylene than conventional polyethylene float drums.

Still yet another object of the invention is to provide a filled polyethylene float drum which is more economical than conventional polyethylene float drums.

These object and other features of the present invention will become apparent to those skilled in the art from a reading and understanding of the following Detailed Description section of the specification taken together with the accompanying drawings.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 1 is a front view of a conventional float drum;

FIG. 2 is a top view of the drum shown in FIG. 1;

FIG. 3 is a side view of the drum shown in FIG. 1;

DETAILED DESCRIPTION

Figure 4:
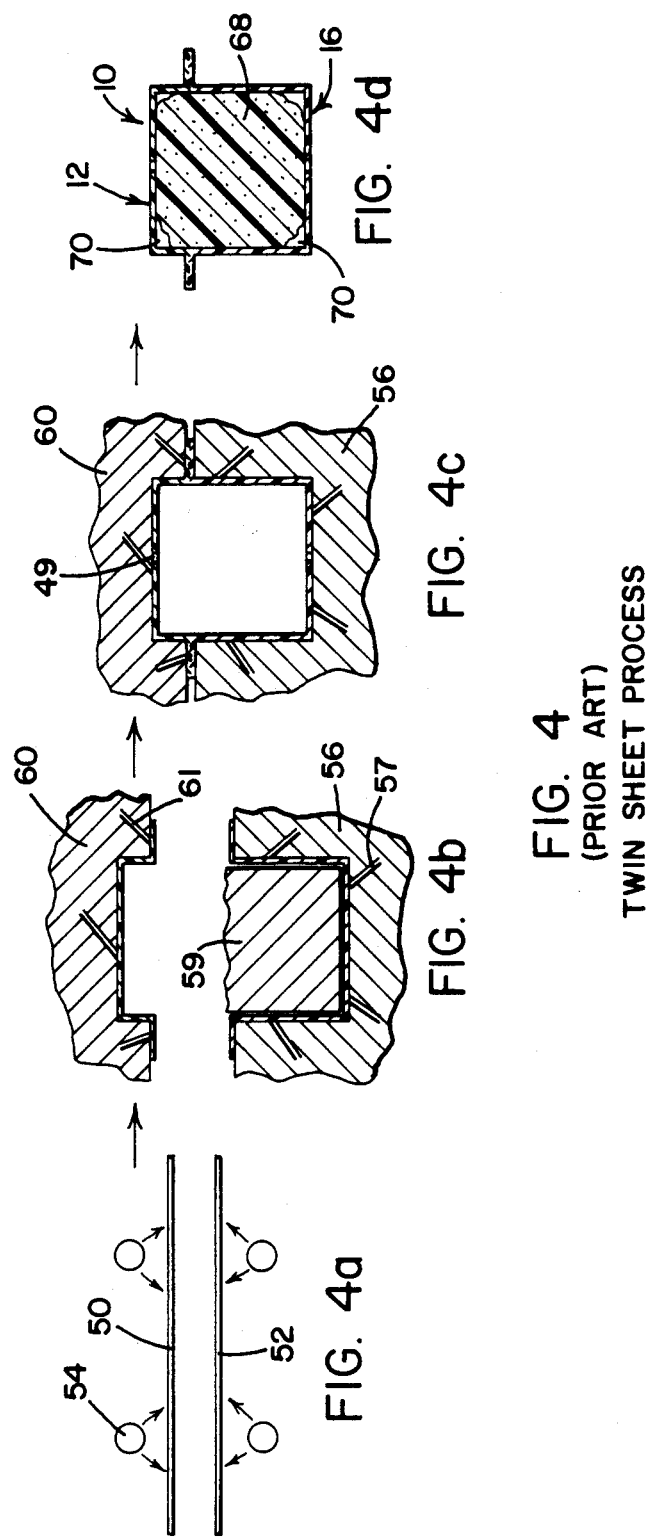
FIG. 4 is a schematic process diagram including FIGS. 4a, 4b, 4c, and 4d schematically showing the prior art two-stage forming process for manufacturing the float shown in FIGS. 1–3.

Referring now to the drawings wherein the showings are for the purpose of illustrating the preferred embodiment of the invention only and not for the purpose of limiting the same, FIGS. 1, 2 and 3 show a conventional polyethylene float drum 10 for supporting marine structures and the like. Drum 10 has a top hollowed portion 12 which terminates in a circumscribing top flange 14a. Float drum 10 has a configured bottom hollowed portion 16 which terminates in a circumscribing bottom flange 14b. Top flange 14a is heat fused to bottom flange 14b to produce an integral load bearing flange 14 circumscribing float drum 10. Top and bottom hollowed portions 12, 14 when thus seated together define a space or an enclosure which has a predetermined configuration defined by the interior surfaces of top and bottom portions 12, 16.

Figure 5:
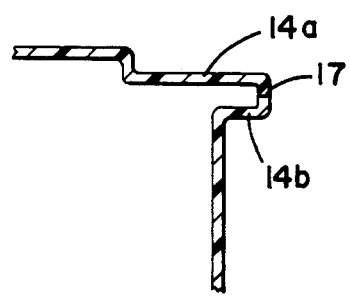
FIG. 5 is a cross-sectional detail of the load supporting flange of a float drum.
Figure 6:
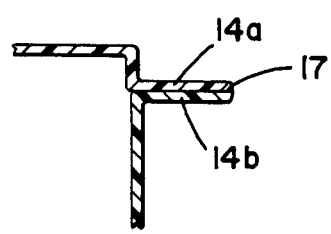
FIG. 6 is a cross-sectional detail of another type of load supporting flange used in the float drum.

As described in greater detail in my prior U.S. Pat. No. 4,799,445, circumscribing flange 14 is a load bearing rigidizing support flange and can take the shape of a spaced a part configuration such as shown in FIG. 5 in which the top and bottom flanges 14a, 14b are fused as at 17 or alternatively, the flanges can simply abut one another and be fused therealong as shown in FIG. 6. For the drum illustrated in FIGS. 1 through 3, the flange arrangement shown in FIG. 6 is used.

Float drum 10 is configured in a shape which rigidizes the thin float walls while also providing a configuration which can receive or nest various standard risers of structural lumber (principally 2×4's and 2×6's) or metal shapes to permit the float to be mounted in a variety of positions to the marine structure or alternatively to be cross braced with appropriate stringers and the like. The term "marine structure" as used herein and in the claims, broadly means any structure which is to be placed in water for support purposes. Examples of marine structures are docks, swim rafts, pipe line support structures, etc. My prior patent sets forth several structures.

Bottom portion 16 is defined by generally rectangular bottom wall 20. Extending upwardly from opposite sides of bottom wall 20 are side walls 22, 23 which terminate in bottom flange 14b. Similarly, extending from the ends of bottom wall 20 are end walls 26, 27 which likewise extend upwardly and terminate at bottom flange 14b. A plurality of flange supporting ribs 30 are molded into side walls 22, 23 and end walls 26, 27 to support load bearing flange 14 while rigidizing bottom portion 16. As best shown in FIGS. 2 and 3, ribs 30 are essentially columnar supports which extend from the underside of bottom flange portion 14b to a position somewhat adjacent bottom wall 20 and for the float shown are generally in the shape of a semi-circular truncated cone having its larger diameter portion 31 adjacent and integral with bottom flange 14b and its minor diameter portion 32 adjacent bottom wall 20.

Side walls 22, 23 and bottom wall 20 are generally flat and to increase their rigidity, indentations 34 are provided in side walls 22, 23 and indentations 36 are provided in bottom wall 20 with bottom wall indentations 36 lined with side wall indentations 34. The indentations 34, 36 can be viewed as rectangularly depressed slots which extend the entire length of side walls 22, 23 and bottom wall 20. Optionally, indentations could be provided in end walls 26, 27.

Top wall portion 12 has a top wall 40 and like bottom portion 16 also has side walls 42, 43 extending from the sides thereof and end walls 45, 46 extending from the ends thereof. Top side walls 42, 43 and top end walls 45, 46 in turn are contiguous with and terminate at top flange 14a which, like bottom flange 14b, extends outwardly away from top wall 40. As was done for bottom float portion 16, top float portion 12 is rigidized by generally rectangular indentations 48 formed in the substantially flat top wall 40. For the float drum 10 shown, indentations 48 and 36 are dimensionally sized so as to permit structural lumber and/or metal shapes to be nested therein. Because float drum 10 shown in FIGS. 1 through 3 is a conventional float, an opening 49 is provided in one of the rectangular indentations 48 through which urethane foam is injected. Again, float drum 10 shown in FIGS. 1 through 3 as a conventional float which is presently produced by the assignee of the invention. The float 10 by itself is not the invention. It has been described and described particularly with reference to load bearing support flange 14, flange supporting ribs 30, and wall strengthening indentations 34, 36 and 48 to illustrate the shape of the especially configured enclosure defined by the interior surfaces of the wall configurations described. In effect, float 10 is a shell which defines an enclosure having a number of nooks and crannies that the plastic foam, even injected under pressure, will not completely fill.

Referring now to FIG. 4, there is shown in schematic form the twin sheet process now used to produce the float drum 10 shown in FIGS. 1 through 3. Reference should be had to the process patents incorporated by reference herein, specifically Anderson U.S. Pat. No. 3,412,183, for a more thorough description of the process. Generally, top portion 12 is formed from a sheet 50 of a fusible, thermal plastic material and bottom portion 16 is formed from another sheet 52 of a fusible, thermal plastic material. Preferably, the sheets are polyethylene. However, reference should be had to the patents incorporated by reference herein which describe in greater detail the range of plastics from which float drums 10 can be manufactured by means of the twin sheet process. Basically, the sheets 50, 52 are initially heated by means of heaters 54 as shown in FIG. 4a to a sag condition. Bottom sheet 52 is positioned over a generally fixed or immovable stationary die 56 which is formed in the shape of bottom portion 16. A plurality of passages 57 formed in stationary die 56 which communicate with the interior of the die permit a vacuum to be drawn through the die so that plastic shape 56 is pulled into the configuration of die 56. In the float drums 10 under discussion, it is important that flange 14 be positioned relatively close to top wall 40. This is so because the dock stringers rest on flange 14 and the dock slats cannot be interference with a top wall 40 projecting above the dock stringers. Also, if dock cross-bracing is used, the cross-bracing must fit within indentations 48 and not extend above the dock stringers. (This is, of course, the preferred positioning and use of floats 10. "Top" and "bottom" as used herein and in the claims are relative orientation terms. Because there are some odd applications where float 10 could be inserted or mounted sideways, top could mean side or bottom, etc.) In any event, top portion 12 is relatively shallow and can be formed from a thinner sheet of plastic typically 0.090 inches when compared to bottom portion 16 which is relatively deep and is formed from a thicker sheet of plastic, i.e. for the float 10 shown in FIGS. 1 through 3, 0.200 inches. Because bottom portion 16 is significantly deeper than top portion 12 and because bottom portion 16 has an especially shaped configuration, it is known that a plug 59 may be used when forming bottom sheet 52 into the configuration of stationary die 57. Plug 59 may be in the general shape of the enclosure defined by the interior surface of bottom portion 16 and is simply used to assist in distending sheet 52 so that the appropriate vacuum openings 57 can draw sheet 52 into the preferred shape. Top sheet 50 is drawn into its proper configuration by means of a movable die 60 which similarly has vacuum openings 61 which draw sheet 50 into the desired configuration of top portion 12. Because of the shallow dimension of top portion 12, the plug 59 is not needed to form top portion 12 in movable die 60. The plug 59 if used, is removed after bottom sheet 52 is drawn by vacuum into the die walls, and movable die 60 moved into contact with stationary die 53 as shown in FIG. 4c where at top flange portion 14a is firmly fused with bottom flange portion 14b to produce an integral flange 14 as noted above. The polyethylene is allowed to cool to its hardened state while dies 60, 56 remain mated to one another and if float 10 is to be filled, a urethane foam may be injected under pressure through opening 49. The theory is that the foam under pressure will fill the enclosure formed by the walls of float 10 supposedly resulting in a solid, completely filled float. After polyethylene has cooled, air is injected through the vacuum openings 57, 61 and the dies 56, 60 are uncoupled and the float removed.

In actuality and as noted above, it has been observed that the foam 68 when hardened has not completely filled the enclosure of float drum 10 and that spaces 70 exist between the walls of the float drum and the foam 68. Also, it has been observed that the wall surfaces of float drum 10 may have not been formed flat and may have experienced random buckles or bows in their shape. While it is not exactly known why this occurs, it is believed that the odd shaped interior configuration of the drum as described above in combination with the dimensional change of the polyethylene during cooling results in the spaces between the foam and the drum and the dimensional distortion of the drum. Further, it is believed that this is inherent in the twin sheet process.

As described thus far, the process and float drum are conventional.

Figure 7:
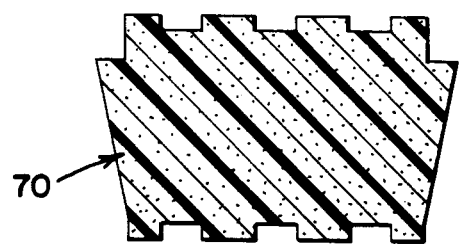
FIG. 7 is a cross-sectional side view of the preformed core of the present invention.
Figure 8:
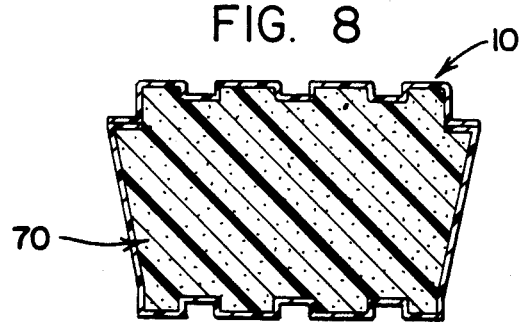
FIG. 8 is a cross-sectional side view of the float drum of the present invention.

Referring now to FIG. 7, there is shown a preformed core 70 which is made of any lightweight, floatable material which can be shaped into a precise form. Any conventional lightweight, buoyant plastic material including foams can be used and those skilled in the art will readily recognize such plastic and thus various plastic compositions are not set forth herein. Preferably, a plastic composition with good compressive strength is chosen, and the plastic is preferably simply molded into the finished form or molded and shaped into the finished form. A material that has been found acceptable is polystyrene. Again, the composition of the polystyrene is chosen such that a core having a good compressive strength is produced. As shown in FIG. 7, preformed polystyrene core 70 is formed into the exact configuration of the interior of float drum 10. That is, there is substantial line to line or area to area contact between the interior surfaces of the walls 20, 22, 23, 26, 27, 40, 42, 43, 45, 46 of float drum 10 with preformed polystyrene core 70. The continuous line to line or area to area contact between the exterior surfaces of preformed core 70 and the interior surfaces of float drum 10 is schematically illustrated in FIG. 8. Referring to the twin sheet process of FIG. 4, it can be seen that a float drum 10 can be formed in this configuration by placing preformed styrofoam polystyrene core 70 into stationary die 56 prior to bringing movable die 60 into the flange seating position. The area to area contact is assured because the polyethylene material contracts when cooling and the contraction will force the walls of polyethylene float 10 tightly against all the external surface of preformed polystyrene core 70. This will eliminate any bowing or bulging of any of the wall surfaces. Also, core 70 provides a support for all of the wall surface area of float 10. Thus, core 70 rigidizes the entire float drum 10 so that if desired, the wall thicknesses could be reduced. As indicated in the drawings of the prior art float shown in FIGS. 1 through 3, the bottom sheet typically has a thickness of about 0.200 inches and the top sheet has a thickness of about 0.090 inches. More specifically, satisfactory float drums can be and are constructed with sheets of this thickness. By using preformed core 70, it is possible, because of the added rigidity of core 70, to reduce the wall thicknesses of float 10 further. Those skilled in the art will understand that wall thickness is a function of the size of the float. Smaller floats are constructed with smaller wall thickness than larger floats. The sheet sizes discussed in this specification are applicable to float drum 10 of the approximate dimension shown in FIGS. 1-3. The point is that whatever standard practice calls for wall thickness for float drums made according to the conventional twin sheet process, float drums of the present invention can be constructed of a lesser wall thickness because of the added rigidity of preformed core 70. This results because preformed core 70 in and of itself has a structural or compressive strength which may be greater than the liquid foams now used to fill the floats (those skilled in the art recognize that the strength of any of the foams now in use can vary widely) and importantly, the interior surfaces of float 10 are completely in contact with the exterior surfaces of preformed core 70. Obviously, reducing the amount of polyethylene used in float drum 10 directly affects the cost of the float drum. For example, the bottom sheet for the float drum size illustrated in FIGS. 1 through 3 is about 0.200" thick. In the float drum 10 of the present invention, the bottom sheet could, of course, remain at 0.200" or be reduced to a lower thickness, potentially to a thickness of about ½, i.e. 0.100". In the discussion thus far the sheets prior to heating have been assumed to be sheets of constant thickness. It is possible that the sheets can have varying thickness which thicknesses are coordinated to match certain sections of float drum 10. The core concept of the present invention would still be applicable. That is, the flange could remain at 0.200" and the thickness in the walls of bottom portion 12 could be reduced.

The invention has been described with reference to a preferred embodiment. It is apparent that many modifications may be incorporated into the float drum disclosed without departing from the spirit or essence of the invention. It is my intention to include all such modifications and alterations insofar as they come within the scope of the present invention.

It is thus the essence of my invention to provide a preformed core made of a buoyant material which core dimensionally conforms exactly to an especially configured enclosure formed by the interior wall surfaces of a plastic float drum.

Having thus defined my invention, I claim:

1. A polyethylene float drum formed by the twin sheet process for supporting marine structures comprising a configured, hollowed top wall portion terminating in a circumscribing top flange; a configured, hollowed bottom wall portion terminating in a circumscribing bottom flange; said top flange and said bottom flange integrally sealed together to define an enclosure having a predetermined configuration defined by the interior surfaces of said top and bottom portions, and a solid polystyrene core of a preformed flotation material substantially filling the entire volume of said configured enclosure whereby said wall surfaces and said float is rigidized said bottom wall portion has a bottom wall, a pair of contiguous side walls extending from the sides of said bottom wall, a pair of contiguous end walls extending from the ends of said bottom wall, each end wall contiguous with a side wall, each side and end wall terminating in a load bearing rigidizing bottom side flange circumscribing said bottom wall portion and extending away from said bottom wall, at least one of said side walls being relatively flat and having at least one flange supporting rib integrally formed therein and interrupting the flatness of said side wall, said rib being generally in the shape of a semi-circular truncated cone with its larger diameter portion integral with said flange and its smaller diameter portion somewhat adjacent said bottom wall, and said core has a bottom wall, a pair of contiguous end walls extending from the ends said bottom wall and a pair of side walls extending the sides of said bottom wall, said core side walls and said core end walls terminating in a top wall, said core side and end walls extending beyond said polyethylene side and end walls, at least one of said cores side walls having a relatively flat surface with a generally truncated semi-circular cone protrusion extending therefrom, said protrusion in continuous line contact with the interior surface of said rib formed in said polyethylene side wall, and said top wall portion has a top wall, a pair of contiguous end wall extending from the ends of said said top wall and a pair of contiguous side wall extending from the sides of said top wall, said top end and top side walls terminating in a load bearing, rigidizing top side flange, said top wall of said top portion generally flat with a series of spaced indentations extending side to side and partially rectangular in cross-sectional configuration;

said core's top wall generally flat with spaced core indentations generally identical to said polyethylene indentations.

2. The float drum of claim 1 wherein said bottom portion is formed from a bottom sheet of no more than about 0.200" thickness and said top portion is formed from a top sheet of no more than about 0.090" thickness whereby a savings in polyethylene is effected for floats having dimensions of about 40"×20", or larger.

3. The float drum of claim 2 wherein the external dimension of said core conforms substantially to the internal dimensions of said top and bottom portions whereby said float has closely controlled tolerances.

* * * * *